(12) United States Patent
Zabihi et al.

(10) Patent No.: US 7,403,491 B2
(45) Date of Patent: Jul. 22, 2008

(54) FRAMEWORK FOR TEMPLATE-BASED RETRIEVAL OF INFORMATION FROM MANAGED ENTITIES IN A COMMUNICATION NETWORK

(75) Inventors: Afshan Zabihi, Kanata (CA); Craig Ellirt Timmerman, Ottawa (CA); Margaret Rachniowski, Nepean (CA)

(73) Assignee: Alcatel Lucent, Paris (FR)

( * ) Notice: Subject to any disclaimer, the term of this patent is extended or adjusted under 35 U.S.C. 154(b) by 833 days.

(21) Appl. No.: 10/824,518

(22) Filed: Apr. 15, 2004

(65) Prior Publication Data

US 2005/0232163 A1 Oct. 20, 2005

(51) Int. Cl.
- H04L 12/28 (2006.01)
- H04L 12/56 (2006.01)
- G06F 15/173 (2006.01)

(52) U.S. Cl. .................. 370/254; 370/258; 370/401; 709/223; 709/224

(58) Field of Classification Search ......... 370/252–254, 370/392–401, 438–475; 709/221–226; 707/102
See application file for complete search history.

(56) References Cited

U.S. PATENT DOCUMENTS

| | | | |
|---|---|---|---|
| 5,978,594 A | 11/1999 | Bonnell | |
| 5,996,012 A * | 11/1999 | Jarriel | 709/226 |
| 6,078,741 A | 6/2000 | Ma et al. | |
| 6,282,175 B1 * | 8/2001 | Steele et al. | 370/254 |
| 6,393,475 B1 * | 5/2002 | Leong et al. | 709/223 |
| 6,493,719 B1 | 12/2002 | Booth | |
| 6,502,130 B1 * | 12/2002 | Keeler et al. | 709/223 |
| 6,704,883 B1 | 3/2004 | Zhang et al. | |
| 7,113,989 B2 * | 9/2006 | Murray et al. | 709/224 |
| 7,177,924 B2 * | 2/2007 | Murray et al. | 709/223 |
| 7,249,170 B2 * | 7/2007 | Tindal et al. | 709/223 |
| 2002/0157020 A1 * | 10/2002 | Royer | 713/201 |
| 2002/0169776 A1 | 11/2002 | Tuunanen | |
| 2003/0126195 A1 | 7/2003 | Reynolds | |
| 2003/0220986 A1 * | 11/2003 | Thakor | 709/220 |
| 2004/0059813 A1 * | 3/2004 | Bolder et al. | 709/224 |
| 2005/0022189 A1 * | 1/2005 | Proulx et al. | 718/100 |
| 2005/0138557 A1 * | 6/2005 | Bolder et al. | 715/700 |
| 2007/0130192 A1 * | 6/2007 | Bolder et al. | 707/102 |

FOREIGN PATENT DOCUMENTS

EP 0791880 8/1997

* cited by examiner

*Primary Examiner*—M. Phan

(57) ABSTRACT

A managed entity view framework and methods for obtaining configuration information, diagnostic information, and statistic information in support of operations management actions is presented. The method includes validating a managed entity viewing script template for execution on a target managed entity, retrieving target managed entity specific template parameter values, populating the managed entity viewing script template to derive a managed entity viewing script therefrom, and submitting the script for execution on the target managed entity. Managed entity viewing scripts are used to retrieve current information from corresponding target managed communications network entities whenever required. Upon receiving a trap at the NMS from a managed communications network entity, trap-directed managed entity viewing scripts are autonomously submitted for execution on the managed communications network entity to collect information for problem isolation and eventual resolution.

29 Claims, 2 Drawing Sheets

FRAMEWORK FOR TEMPLATE-BASED RETRIEVAL OF INFORMATION FROM MANAGED ENTITIES IN A COMMUNICATION NETWORK

FIELD OF THE INVENTION

The invention relates to communications network provisioning, and in particular to methods providing managed communications network entity configuration management, diagnosis and statistics reporting.

BACKGROUND OF THE INVENTION

In the field of communications network provisioning, Network Management Systems (NMS), such as Alcatel 5620 NMS, model the operation of managed communications network entities constituent of a managed communications network infrastructure based on event notifications issued the managed communications network entities.

In accordance with modeled managed communication network entity operations management, designing, testing, validating and maintaining managed communications network entity models is time-consuming particularly when considering that the managed communications network entities (hardware switching nodes, aggregation nodes, deaggregation node, rack, interface card, statistics collector, router, bridge, etc. and software virtual router managed entities) have multiple types and versions thereof and are developed and updated by multiple vendors in accordance with a variety of schedules none of which are under the control of service providers.

While the modeling of managed communications network entities is of a tremendous help when models are available and up to date, performing operations management in accordance with this paradigm hinders communications network management operations when models are not available or out of date. Probably the worst possible situation, encountered in the competitive communications service provisioning environment, is making a decision not to upgrade a managed communications network entity, as a corresponding NMS model upgrade is not available, because the managed communications network entity would be rendered unmanageable.

A large proportion of network management operations and related actions depend on current configuration, diagnostic, and statistic information being available. The requirement of having an updated managed communications network entity model for retrieving current configuration, diagnostic, and statistic information is seen as a stringent requirement "and a tall order."

In interacting with managed entity models to effect operations management in the NMS context, ultimately the NMS system issues Command Line Interface (CLI) commands to target managed communications network entities. Another way to effect operations management is for service provider operations management personnel, interacting with the NMS, to issue CLI commands and/or employ CLI command scripts for execution directly to target managed communications network entities on an as-needed basis. While CLI-based operations management may augment model-based operations management in a network management context, employing CLI-based operations management provides a level of flexibility while suffering from: a high learning curve associated with attaining proficiency in CLI-based operations management, a high overhead associated with sustaining proficiency in CLI-based operations management, an exposure to human error in entering CLI commands, an operational overhead incurred from time consuming CLI command entry, etc. Some of these issues are made worse by the fact that CLI command sets are specific to equipment manufacturers, equipment types, equipment versions, etc. Therefore, CLI commands are managed-entity-specific, which makes supporting many types of managed entity difficult for operations management personnel because of the number and size of the CLI command sets that must be mastered.

The known patent prior art describes systems and methods having CLI-based functionality addressing differences in managed-entity-specific CLI command sets attempting to reduce the need for operations management personnel to master all CLI command sets.

A prior art U.S. patent application publication No. 2003/0135508 entitled "Translating Configuration Files Among Network Devices" published on Jul. $17^{th}$, 2003 by Chorafakis et al. describes translating CLI scripts written in one CLI command set to an equivalent script written in another CLI command set.

A prior art U.S. patent application publication No. 2003/0126195 entitled "Common Command Interface" published on Jul. $3^{rd}$, 2003 by Reynolds et al. describes an interface abstraction for allowing network devices to maintain one set of code for each command regardless of the command interface (e.g. web, CLI, NMS, etc.) The interface is expanded to a community command interface for connecting to multiple network devices.

A prior art U.S. Pat. No. 6,493,719 entitled "Method and System for Scripting System Management Information" which issued on Dec. $10^{th}$, 2002 to Booth et al., describes the transformation of scripts to low-level syntax, use of monikers to simplify strings in scripts, and script collections to enable a set of objects to be serviced iteratively, for example, regular retrieval of resource properties.

While the above mentioned attempts alleviate the above mentioned issues to some extent, human involvement remains necessary therefore an exposure to human error still remains.

Further prior art addresses automated operations management issues associated with CLI-based operations management using CLI scripts:

A prior art U.S. patent application publication No. 2002/0169776 entitled "Network Architecture and Methods for Service Script Execution and Management" published on Nov. $14^{th}$, 2002 by Tuunanen et al., describes "arming" scripts prior to execution according to specific conditions provided by user profile data or a secondary database, and executing the script upon the occurrence of an event.

A prior art U.S. Pat. No. 5,978,594 entitled "System for Managing Computer Resources Across a Distributed Computing Environment by First Reading Discovery Information About how to Determine System Resources Presence" which issued on Nov. 2, 1999 to Bonnell et al., describes interpretable scripts that are automatically executed upon the occurrence of events (e.g. alarm conditions).

While the above two mentioned attempts reduce lengthy manual entry of, and interaction with, CLI scripts to some extent, the automation leaves managed entities exposed to being overloaded with a large number of CLI command scripts which if executed would negatively affect the performance and operation of the managed entities.

There therefore is a need to solve the above mentioned issues.

SUMMARY OF THE INVENTION

In accordance with an aspect of the invention, a method of performing configuration change management in a network management context is provided. The method includes: validating a managed entity viewing script template submitted for execution on a target managed entity, conditionally deriving a managed entity viewing script from the managed entity viewing script template based on positive validation, and submitting the derived managed entity viewing script for execution on the target managed entity.

In accordance with another aspect of the invention, the method includes retrieving managed entity viewing script output including one of a configuration information, diagnostic information, statistic information, and error information from the target managed entity.

In accordance with a further aspect of the invention, the method further includes: time stamping retrieved managed entity viewing script output.

In accordance with a further aspect of the invention, the method further includes storing retrieved managed entity viewing script output in a Network Management System (NMS) repository.

In accordance with a further aspect of the invention, storing retrieved managed entity viewing script output includes: appending the retrieved managed entity viewing script output to a log file, and optionally truncating the log file when a maximum log file size is exceeded.

In accordance with a further aspect of the invention, the method further includes comparing two retrieved managed entity script outputs.

In accordance with a further aspect of the invention, the method further includes: selecting the managed entity viewing script template from a multitude of managed entity viewing script templates, and selecting the target managed entity from a multitude of managed entities.

In accordance with a further aspect of the invention, selecting the managed entity viewing script template includes subjecting the plurality of managed entity viewing script templates to a managed entity viewing script template filter.

In accordance with a further aspect of the invention, selecting the target managed entity includes subjecting the plurality of managed entities to a managed entity filter.

In accordance with a further aspect of the invention, the method further includes: receiving a trap, determining a target managed entity associated with the received trap, and determining a managed entity viewing template to be submitted for execution on the determined target managed entity based on the received trap.

In accordance with a further aspect of the invention, the method includes: specifying a sequence of Command Line Interface (CLI) commands in creating the managed entity viewing script template; and ascribing an identifier to the managed entity viewing script template specifying a managed entity make, a managed entity type, and a managed entity CLI command set version.

In accordance with a further aspect of the invention, specifying the sequence of CLI commands includes specifying at least one login CLI command.

In accordance with a further aspect of the invention, submitting multiple managed entity viewing scripts for execution on the target managed entity includes scheduling the multiple managed entity viewing scripts for execution on the target managed entity.

In accordance with a further aspect of the invention, submitting multiple managed entity viewing scripts for execution on the target managed entity includes sequencing the multiple managed entity viewing scripts preventing concurrent execution thereof on the target managed entity.

In accordance with a further aspect of the invention, the managed entity viewing script template is parameterized and deriving the managed entity viewing script includes: retrieving target managed entity parameter values from an NMS repository, and populating managed entity viewing script template parameters with the retrieved managed entity parameter values.

In accordance with a further aspect of the invention, the method further includes: determining a parameter for which a corresponding target managed entity parameter value is not available in the NMS repository, and prompting operations management personnel to input a corresponding parameter value.

In accordance with a further aspect of the invention, prompting operations management personnel to input the parameter value includes presenting operations management personnel with a default parameter value.

In accordance with a further aspect of the invention, validating the managed entity viewing script template for execution on the target managed entity includes asserting positive validation when, aside from equipment make and type validation, the CLI command set version of the managed entity viewing script template is lower than the CLI command set version reported by a NMS repository in respect of the target managed entity.

In accordance with a further aspect of the invention, a managed entity viewing framework is provided. The framework includes managed entity viewing script template selection means for selecting at least one managed entity script template for execution, managed entity selection means for selecting at least one target managed entity, managed entity viewing script template submission means for submitting the at least one selected managed entity script template for execution on the at least one selected target managed entity, validation means for validating the submission of the at least one managed entity viewing script template for execution on the at least one selected target managed entity, and a managed entity viewing framework process executing in a network management context for obtaining target managed entity information from a NMS repository in support of populating the at least one managed entity viewing script template in obtaining a corresponding at least one managed entity script, and managed entity viewing script submission means for submitting the at least one managed entity script for execution on the at least one selected target managed entity.

In accordance with a further aspect of the invention, the managed entity viewing script submission means further includes a script sequencer for sequencing multiple managed entity viewing scripts submitted for execution on a target managed entity in preventing concurrent managed entity viewing script execution thereon.

In accordance with a further aspect of the invention, the script sequencer further includes a queue.

In accordance with a further aspect of the invention, the managed entity viewing script submission means further includes a script scheduler for pacing the submission for execution of a multitude of managed entity viewing scripts.

In accordance with a further aspect of the invention, the script scheduler further comprises a queue.

In accordance with a further aspect of the invention, the managed entity viewing framework includes autonomous means for submitting a managed entity viewing template for execution upon receiving a trap.

In accordance with a further aspect of the invention, the managed entity viewing framework further includes a human-machine interface for creating a managed entity viewing script template.

In accordance with a further aspect of the invention, the managed entity viewing framework further includes a human-machine interface for manipulating at least one managed entity viewing script template.

In accordance with a further aspect of the invention, the managed entity viewing framework further includes a human-machine interface displaying results of the execution of a managed entity viewing script on a target managed entity.

In accordance with a further aspect of the invention, the managed entity viewing framework further includes means for authenticating operations management personnel for submitting the at least one managed entity viewing script for execution on the at least one target managed entity.

In accordance with a further aspect of the invention, the managed entity viewing framework further includes means for automatically logging on the target managed entity in submitting the managed entity viewing script for execution thereon.

In accordance with yet another aspect of the invention, the at least one managed entity viewing script template includes one of: a show VRF script template, show label switched path script template, and show interface script template.

The advantages are derived from a reduced need to model, and maintain models of, managed communications network entities, therefore reducing the need update managed communications network entity model data including managed communications network entity configuration information, diagnostic information, and/or statistic information. Instead managed entity viewing scripts are used to retrieve current configuration information, diagnostic information, and statistic information from corresponding target managed communications network entities whenever required. Advantages are also derived from reducing the need for extensive operations management personnel training providing ease and speed in selecting CLI commands scripts to obtain configuration information, diagnostic information, and statistic information, without manually logging in on target management entities. Further advantages are derived from provides an improved information collection means for diagnosis. Upon receiving a trap at the NMS from a managed communications network entity, trap-directed managed entity viewing scripts are autonomously submitted for execution on the managed communications network entity to collect configuration information, diagnostic information, and/or statistical information for problem isolation and eventual resolution. These benefits lead to reduced operations management costs for service providers managing communications networks.

BRIEF DESCRIPTION OF THE DRAWINGS

The features and advantages of the invention will become more apparent from the following detailed description of the exemplary embodiment(s) with reference to the attached diagrams wherein.

It will be noted that in the attached diagrams like features bear similar labels.

DETAILED DESCRIPTION OF THE EMBODIMENTS

Operations management actions necessary in responding to reported alarms and conditions experienced by the managed infrastructure may be undertaken in a network management context if at least managed entity configuration information, diagnostic information, and statistic information is available.

Figure 1:
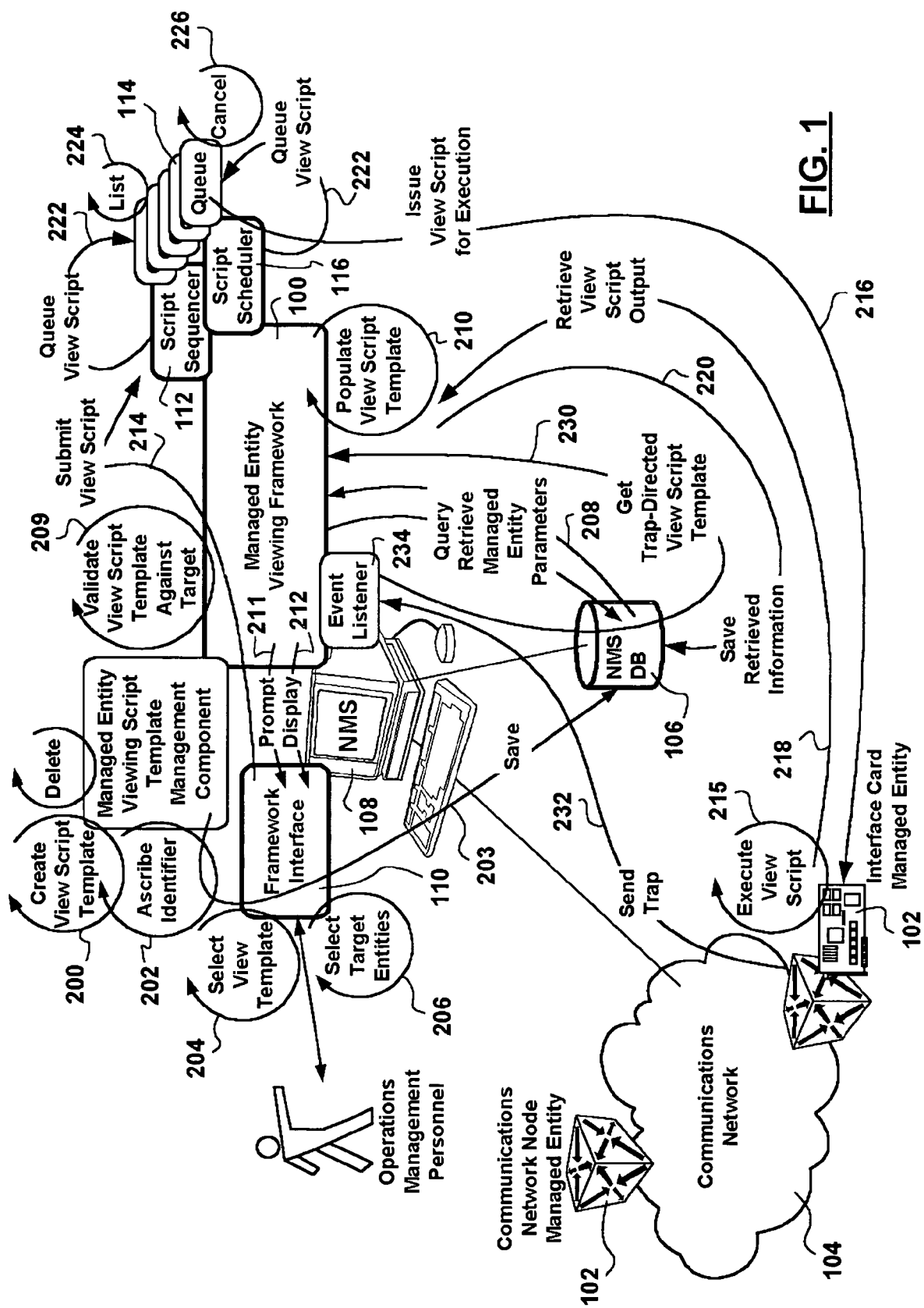
FIG. 1 is a schematic diagram showing interacting elements implementing, in accordance with an exemplary embodiment of the invention, a managed entity viewing framework employed in a network management context.

In accordance with an exemplary embodiment of the invention, configuration information, diagnostic information, and statistics information is pulled in a network management context from managed communications network entities as required. Accordingly, a managed entity viewing framework 100, shown in FIG. 1, enables operations management personnel to create 200 and manage generic "show" Command Line Interface (CLI) scripts (templates) to: request from, retrieve from, and display: configuration information, diagnostic information, and statistics information concerning selected managed communications network entities 102 installed in a communications network 104. Each managed entity viewing script template is a collection of CLI commands having semantics, and written in syntax, native to a corresponding target managed entity 102.

Each managed entity viewing template must be compatible with target managed entity 102 on which the managed entity viewing template is intended to be executed. The managed entity viewing script template includes an ascribed (202) identifier (see FIG. 2) specifying the vendor/equipment manufacturer 302, the equipment type 306, the CLI set version 308 employed in creating the managed entity viewing template. Once created 200, managed entity viewing script templates are stored 203 in a Network Management System (NMS) repository 106 associated with the NMS 108.

Each managed entity viewing script template is parameterized enabling reuse in respect of a group of managed entities. The NMS repository 106 also includes managed entity parameter sets. The managed entity viewing template framework concerns itself at a minimum with managed entity inventory information and authorization/authentication information stored in the NMS repository 106, however the NMS repository 106 may store complete information regarding managed entities 102 particularly for modeled managed entities 102. Operations management personnel user accounts may also be managed by the NMS system 108.

In particular, each managed entity viewing template may include, in the preamble parameterized login commands enabling automated login on target managed entities 102 for executing CLI commands in obtaining configuration, diagnostic, and statistic information therefrom. Alternatively, the managed entity viewing template framework 100 or the NMS system 108 may provide automated login functionality for logging in to managed entities 102.

In operation, via an NMS interface 110, a managed entity viewing template is selected 204 and at least one target managed entity in a managed communications network is selected 206. The NMS system 108 queries 208 the NMS repository 106 using the managed entity viewing template identifier, and the target managed entity 102, as keys. From the query responses (208), the NMS system 108 determines (validates) 209 whether the managed entity viewing template corresponds to the target managed entity 102. If so, the NMS system 108 further determines based on user name information, whether operations management personnel has the necessary authorizations. If so, the NMS system 108 populates 210 the managed entity view script template with valid target managed entity specific parameter values. It may be that, some managed entity view script template parameters cannot be populated 210 with parameter values tracked in the NMS repository 106—the operations management personnel is asked 211 to enter parameter values for all such parameters or at least asked 211 whether to employ parameter value defaults. Once the managed entity view script template is fully populated 210, it becomes a managed entity view script. The managed entity view script may be displayed 212 to operations management personnel for inspection. Operations management personnel interacting with the managed entity viewing framework interface 110 submits 212 the managed entity view script for execution 215 on the target managed entity 102.

Depending on the CLI commands issued 216 for execution 215, the managed entity 102 may be subjected to intensive processing or a lot of information is generated, such as but not limited to: a full communications network node configuration dump, reconcile a Forwarding Information Base (FIB), etc., information which is to be returned 218 to the NMS system 108/managed entity viewing framework 100. Conveying a lot of information between the target managed entity 102 and the NMS system 108 raises bandwidth utilization issues.

As the managed entity view script executes 215 on the target managed entity 102, the configuration information output, diagnostic information output and/or the statistics information output is retrieved 218 by the NMS system 108 and may be displayed 212 to operations management personnel. The retrieved configuration information, diagnostic information, and statistics information may be stored 220, with date and time (timestamp) information, in the NMS repository 106 for future reference.

Figure 2:
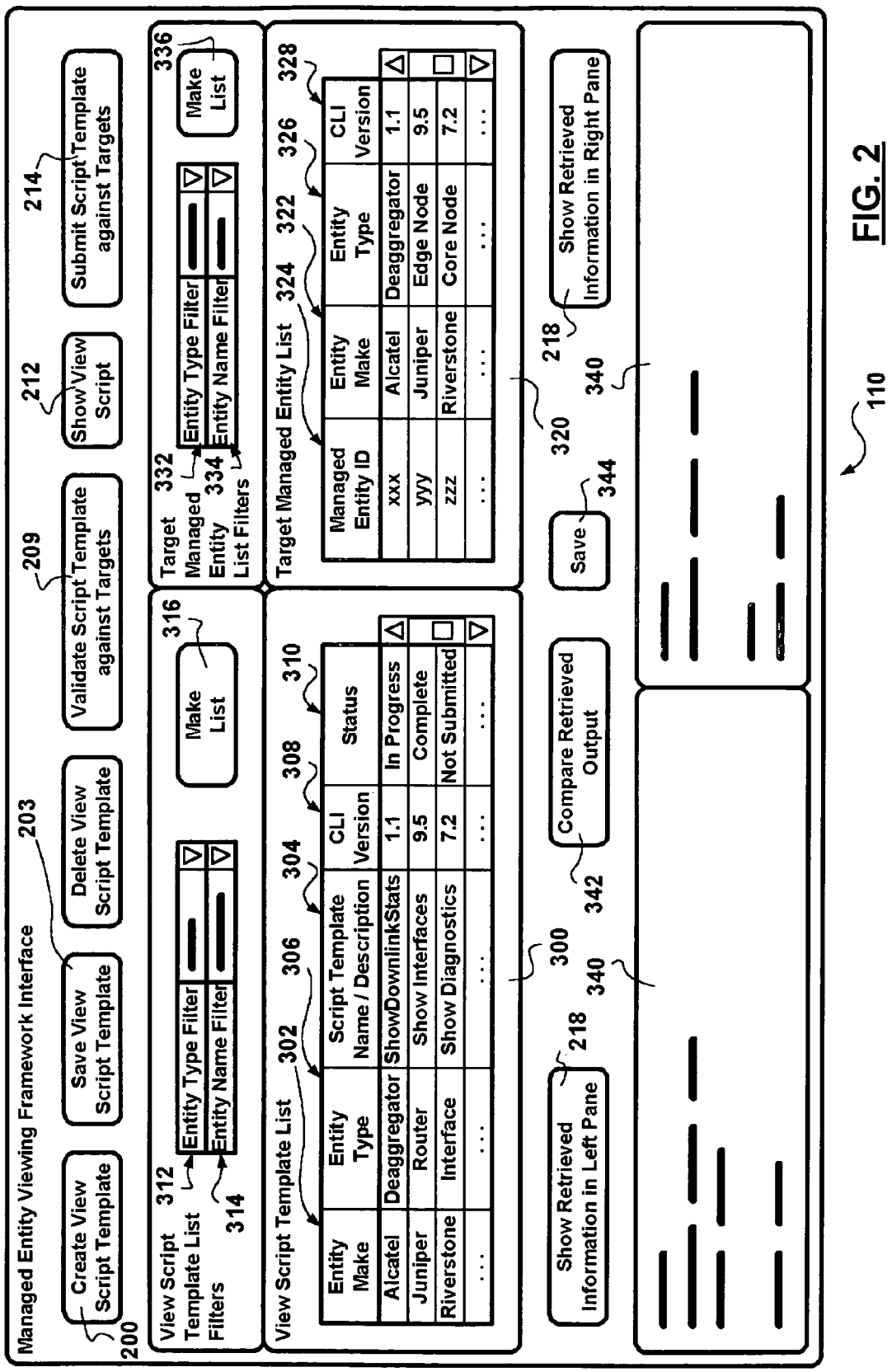
FIG. 2 is a schematic diagram showing, in accordance with an exemplary implementation of the exemplary embodiment of the invention, elements of a managed entity viewing framework interface.

Making reference to FIG. 2, the issuance 216 of a managed entity viewing script for execution 215 on at least one target managed entity 102 can be associated to a menu item, button, or other user action performed via an NMS interface 110 delivering custom operations management features in the network management context. When the menu item, button, etc. is interacted with, a managed entity viewing framework (generated) window (110) will pop-up providing interaction with the corresponding managed entity viewing template and eventually for displaying 212 the results of the executed 215 managed entity viewing script. Collecting 218, comparing 342, and saving 344 the results may also be bound to a menu item, button, or other user action.

Therefore, the managed entity view framework 100 provides management operations personnel with the means for requesting (216) and retrieving (218) configuration information, diagnostic information, and statistics information from managed communications network entities 102 using managed entity viewing scripts, without understanding managed-entity-specific CLI commands and without spending time in logging onto managed entities 102. Employing the managed entity view framework 100 reduces the need for modeling managed entities 102 and for actively tracking exhaustive managed entity specific information in the NMS repository 106 in providing support of network management operations.

In accordance with the exemplary embodiment of the invention, the managed entity viewing framework 100 includes a viewing script sequencer 312. The managed entity viewing framework 100 prevents concurrent execution 215 of managed entity viewing scripts on the same target managed entity 102. Instead, multiple managed entity viewing scripts intended for execution 215 on a particular target managed entity 102 are queued 222 in a queue 114, and the managed entity viewing framework 100 ensures sequential issuance of managed entity viewing scripts reducing the possibility of bogging down the target managed entity 102.

Additionally, the number of managed entity viewing scripts in queue 114 may be controlled. Queue control functionality may be provided including listing 224 queued/pending managed entity viewing scripts, and canceling 226 selected queued managed entity viewing scripts.

In accordance with the exemplary embodiment of the invention, the managed entity viewing framework includes a scheduler 116. Scheduling managed entity viewing scripts provides means for performing diagnostics on, and/or obtaining statistics regarding, target managed entities 102 at regular intervals.

In accordance with the exemplary embodiment of the invention, the sequencer 112 and the scheduler 116 co-operate in ensuring that multiple managed entity viewing scripts to be issued for execution 215 on a target managed entity 102, are spaced apart in time, to prevent adversely affecting the operation of the target managed entity 102. The managed entity viewing framework 100 employing the sequencer 112 and scheduler 116 provides functionality for executing 215 multiple managed entity viewing scripts on multiple target managed entities 102 simultaneously, while ensuring that each target managed entity 102 executes 215 a single managed entity viewing script at a particular time.

In accordance with the exemplary embodiment of the invention, support for trap-directed managed entity viewing script execution is provided. A trap-directed managed entity script template is autonomously selected 230 by the NMS/managed entity viewing framework 100 for execution 215 on at least one target managed-entity 214 based on a trap. The trap may be sent 232 by a managed entity 102, generated by a timer, or generated by a timeout. Received traps may be intercepted by an event listener module 234 associated with the NMS system 108/managed entity viewing framework 100. A managed entity viewing template may be defined for the trap, or the managed entity viewing template may be retrieved 230 from the NMS repository 106 based on managed entity particulars reported by the managed entity which sent 232 the trap. The managed entity particulars may concern the managed entity itself or another valid managed entity. The once the at least one managed entity viewing template is retrieved 230, target managed entity specific information is retrieved 208 form the NMS repository 106, the managed entity viewing template is populated 210, default parameter values are employed in populating parameters for which managed entity information is not available in the NMS repository 106, the resulting managed entity viewing script is submitted 214 for execution 215 on the managed entity 102 to collect information about the managed entity 102 including, but not limited to: configuration information, diagnostics information, and/or statistics data. The resulting managed entity viewing script may be validated (209), prior to submission 214, to the extent it can be determined that the target managed entity 102 is not put out of service by the script due to default values being employed.

For certainty, the output of execution 215 of the managed entity viewing script submitted is retrieved 218 regardless whether the output actually contains configuration information, diagnostic information, statistic information or not. It is possible for the execution 215 to fail, in which case error information is retrieved 218. The storage 220 of the output of executed managed entity viewing scripts enables output comparison 342.

It is typically the case, while not assured, that a later version of a CLI command set are backward compatible with previous versions of the CLI command set. In such cases, in validating 209 whether a selected managed entity viewing template can be submitted 214 for execution 215 on a target managed entity 102, the validation 209 will return a positive result if, aside from the make and equipment type validation, the CLI command set version of the managed entity viewing template is lower than the CLI command set version reported by the NMS repository 106 in respect of the target managed entity 102.

The detailed description herein will below make reference to router managed communications network entities 102 for illustrative purposes without limiting the invention thereto. In interacting with router managed entities 102, a managed entity viewing template is know as a Router Viewing Template (RVT).

Upon creating 200 an RVT, the RVT must be associated with one or more managed vendor-specific/equipment-type-specific/version-specific router 102, before the RVT can be issued 216 for execution 215 thereon.

FIG. 2 shows an exemplary managed entity viewing framework interface 110 employed in a network management context of an NMS 108. An exemplary table of active RVTs 300 is shown in a pane of the interface window (110). The communications network node make 302, name/description 304, target managed entity type 306, CLI command set version 308, and processing status information 310 for each RVT are listed in corresponding table entries. Filtering means by communications network node type 312 and communications network node name 314 are provided to control the number and type of RVTs displayed. A make list button 316 may be employed in generating managed entity viewing template lists. For example, a "show interfaces" RVT has completed on a router managed entity 102, which indicated in the corresponding status field 310. In another pane 320 of the managed entity viewing framework interface window (110), target managed entities 102 associated with at least one currently selected RVT are listed. The communications network node make 322, identifier 324, target managed entity type 326, CLI command set version 328, and for each managed entity entry. Filtering means by communications network node type 332 and communications network node name 334 are provided to control the number and type of managed entities displayed. A make list button 336 may be employed in generating managed entity lists. At least one bottom pane 340 displays the results of RVT completed execution on a selected managed entity target 102. A compare retrieved output button 342 causes results displayed in panes 340 to be formatted so as to point out differences therebetween either through highlighting and/or alignment. A save button 344 is provided for saving retrieved output in the NMS repository 106.

The RVT filtering means 312/314 provide operations management personnel with ease and speed in determining what managed entity view scripts to submit 214 for execution 215 and therefore ultimately contributing ease and speed in obtaining (218) configuration information, diagnostic information, and/or statistic information regarding managed communications network entities 102 in the network management context in support of operations management actions.

If multiple RVTs are queued 222 for execution 215 on the same managed entity 102, the displayed status (310) of all waiting RVTs is "In Progress" while currently running/queued RVTs complete execution 215.

The management operations personnel is provided with the means to preview 212 a populated RVT script, via the managed entity viewing framework interface 110, by selecting the target managed entity 212 and requesting a preview via user action, button, or menu item 212. The preview request (212) displays a dialog box (not shown) to the management operations personnel showing the actual managed entity CLI view script commands with substituted parameters that would be issued 216 to the target managed entity 102.

In accordance with an exemplary implementation of the exemplary embodiment of the invention, configurations information, diagnostic information, and/statistics information is saved 220 in an RVT log corresponding to the RVT/target-managed-entity combination, the RVT log representing a history of reported configuration information, diagnostic information, and statistics information. The RVT log may be stored 220 in the associated NMS repository 106. The size of the RVT log is configurable in order to reduce RVT log storage requirements. The size of the RVT log may default to 1 MB and each RVT may be truncated as the size is exceeded.

Exemplary RVTs include, without limiting the invention thereto: a show VRF script template, show Label Switched Path script template, a show interface script template, a show diagnostic information script template, a show downlink statistics information, etc.

In accordance with the exemplary embodiment of the invention, employing the managed entity viewing framework 100 reduces the need to model, and maintain models of, managed communications network entities 102. Employing managed entity viewing templates reduces the need update managed communications network entity model data including managed communications network entity configuration information, diagnostic information, and/or statistic information. Instead managed entity viewing scripts are used in a network management context to retrieve 218 current configuration information, diagnostic information, and statistic information from corresponding target managed communications network entities 102 whenever required.

In accordance with the exemplary embodiment of the invention, employing the managed entity viewing framework 100 reduces the need for extensive operations management personnel training. The managed entity viewing framework enables operations management personnel interacting with the NMS system 108 to retrieve 218 information from a managed communications network entity 102 without the need to understand and input managed communications network entity-specific CLI commands to obtain configuration information, diagnostic information, and statistic information, and/or to manually log onto the managed entity 102.

In accordance with the exemplary embodiment of the invention, employing the managed entity viewing framework 100 provides an improved information collection means for diagnosis. Upon receiving 232 a trap at the NMS system 108 (event listener 234) from a managed communications network entity 102, trap-directed managed entity viewing scripts are autonomously submitted 214 for execution 215 on the managed communications network entity 102 to collect configuration information, diagnostic information, and/or statistical information for problem isolation and eventual resolution.

These benefits lead to reduced operations management costs for service providers managing communications networks 104.

The embodiments presented are exemplary only and persons skilled in the art would appreciate that variations to the above described embodiments may be made without departing from the spirit of the invention. The scope of the invention is solely defined by the appended claims.

We claim:

1. A method of performing configuration change management in a network management context, the method comprising steps of:
   a. validating a managed entity viewing script template submitted for execution on a target managed entity;
   b. conditionally deriving a managed entity viewing script from the managed entity viewing script template based on positive validation; and
   c. submitting the derived managed entity viewing script for execution on the target managed entity,
   wherein validating the managed entity viewing script template for execution on the target managed entity, the method further comprises a step of: asserting positive validation, when aside from equipment make and type validation, the Command Line Interface (CLI) command set version of the managed entity viewing script template is lower than the CLI command set version reported by a Network Management System (NMS) repository in respect of the target managed entity.

2. The method claimed in claim 1, further comprising a subsequent step of retrieving managed entity viewing script output including one of configuration information, diagnostic information, statistic information, and error information from the target managed entity.

3. The method claimed in claim 2, further comprising a step of time stamping retrieved managed entity viewing script output.

4. The method claimed in claim 2, further comprising a step of storing retrieved managed entity viewing script output in a Network Management System (NMS) repository.

5. A method of performing configuration change management in a network management context, the method comprising steps of:
   a. validating a managed entity viewing script template submitted for execution on a target managed entity;
   b. conditionally deriving a managed entity viewing script from the managed entity viewing script template based on positive validation; and
   c. submitting the derived managed entity viewing script for execution on the target managed entity,
   further comprising subsequent steps of retrieving managed entity viewing script output including one of configuration information, diagnostic information, statistic information, and error information from the target managed entity, and storing retrieved managed entity viewing script output in a Network Management System (NMS) repository,
   wherein storing retrieved managed entity viewing script output, the method further comprises steps of:
   d. appending the retrieved managed entity viewing script output to a log file; and
   e. optionally truncating the log file when a maximum log file size is exceeded.

6. The method claimed in claim 2, further comprising a step of comparing two retrieved managed entity script outputs.

7. The method claimed in claim 1, further comprising previous steps of:
   a. selecting the managed entity viewing script template from a plurality of managed entity viewing script templates; and
   b. selecting the target managed entity from a plurality of managed entities.

8. The method claimed in claim 7, wherein selecting the managed entity viewing script template, the method further comprises a step of subjecting the plurality of managed entity viewing scrip templates to a managed entity viewing script template filter.

9. The method claimed in claim 7, wherein selecting the target managed entity, the method further comprises a step of subjecting the plurality of managed entities to a managed entity filter.

10. The method claimed in claim 1, further comprising prior steps of:
    a. receiving a trap;
    b. determining a target managed entity associated with the received trap; and
    c. determining a managed entity viewing template to be submitted for execution on the determine target managed entity based on the received trap.

11. A method of performing configuration change management in a network management context, the method comprising steps of:
    a. validating a managed entity viewing script template submitted for execution on a target managed entity:
    b. conditionally deriving a managed entity viewing script from the managed entity viewing script template based on positive validation;
    c. submitting the derived managed entity viewing script for execution on the target managed entity;
    d. specifying a sequence of Command Line Interface (CLI) commands in creating the managed entity viewing script template; and
    e. ascribing an identifier to the managed entity viewing script template specifying a managed entity make, a managed entity type, and a managed entity CLI command set version.

12. The method claimed in claim 11, wherein specifying the sequence of CLI commands, the method further comprises a step of specifying at least one login CLI command.

13. The method claimed in claim 1, wherein submitting the managed entity viewing script for execution on the target managed entity, the method further comprises a step of scheduling the managed entity viewing script for execution.

14. The method claimed in claim 1, wherein submitting a plurality of managed entity viewing scripts for execution on the target managed entity, the method further comprises a step of sequencing the plurality of managed entity viewing scripts preventing concurrent execution thereof on the target managed entity.

15. A method of performing configuration change management in a network management context, the method comprising steps of:
    a. validating a managed entity viewing script template submitted for execution on a target managed entity;
    b. conditionally deriving a managed entity viewing script from the managed entity viewing script template based on positive validation; and
    c. submitting the derived managed entity viewing script for execution on the target managed entity,
    the managed entity viewing script template is parameterized, wherein deriving the managed entity viewing script from the managed entity viewing script template, the method further comprising step of:
    d. retrieving target managed entity parameter values from a Network Management System (NMS) repository; and
    e. populating managed entity viewing script template parameters with the retrieved managed entity parameter values.

16. The method claimed in claim 15, further comprising steps of:
   a. determining a parameter for which a corresponding target managed entity parameter value is not available in the NMS repository; and
   b. prompting operations management personnel to input a corresponding parameter value.

17. The method claimed in claim 16, wherein prompting operations management personnel to input the parameter value, the method further comprises a step of presenting operations management personnel with a default parameter value.

18. A managed entity viewing framework comprising:
   a. managed entity viewing script template selection means for selecting at least one managed entity viewing script template for execution;
   b. managed entity selection means for selecting at least one target managed entity;
   c. managed entity viewing script template submission means for submitting the at least one selected managed entity script template for execution on the at least one selected target managed entity;
   d. validation means for validating the submission of the at least one managed entity viewing script template for execution on the at least one selected target managed entity; and
   e. a managed entity viewing framework process executing in a network management context for obtaining target managed entity information from a Network Management System (NMS) repository in support of populating the at least one managed entity viewing script template in obtaining a corresponding at least one managed entity viewing script; and
   f. managed entity viewing script submission means for submitting the at least one managed entity script for execution on the at least one selected target managed entity.

19. The managed entity viewing framework claimed in claim 18, wherein the managed entity viewing script submission means further comprises a script sequencer for sequencing a plurality of managed entity viewing scripts submitted for execution on a target managed entity in preventing concurrent managed entity viewing script execution thereon.

20. The managed entity viewing framework claimed in claim 19, wherein the script sequencer further comprises a queue.

21. The managed entity viewing framework claimed in claim 18, wherein the managed entity viewing script submission means further comprises a script scheduler for pacing the submission for execution of a plurality of managed entity viewing scripts.

22. The managed entity viewing framework claimed in claim 21, wherein the script scheduler further comprises a queue.

23. The managed entity viewing framework claimed in claim 18, further comprising autonomous means for submitting a managed entity viewing template for execution upon receiving a trap.

24. The managed entity viewing framework claimed in claim 18, further comprising a human-machine interface for creating a managed entity viewing script template.

25. The managed entity viewing framework claimed in claim 18, further comprising a human-machine interface for manipulating at least one managed entity viewing script template.

26. The managed entity viewing framework claimed in claim 18, further comprising a human-machine interface displaying results of the execution of a managed entity viewing script on a target managed entity.

27. The managed entity viewing framework claimed in claim 18, further comprising means for authenticating operations management personnel for submitting the at least one managed entity viewing script for execution on the at least one target managed entity.

28. The managed entity viewing framework claimed in claim 18, further comprising automated means for logging on the target managed entity in submitting the managed entity viewing script for execution thereon.

29. The managed entity viewing framework claimed in claim 18, wherein the at least one managed entity viewing script template includes one of: a show VRF script template, show Label Switched Path script template, and a show interface script template.

* * * * *